United States Patent [19]

Lagares

[11] Patent Number: 5,097,876
[45] Date of Patent: Mar. 24, 1992

[54] PROCESS AND MACHINE FOR GAUGING AND STUFFING MEAT PRODUCTS UNDER VACUUM CONDITIONS

[75] Inventor: Narciso C. Lagares, Besalu, Spain
[73] Assignee: Metalquimia, S.A., Girona, Spain
[21] Appl. No.: 524,872
[22] Filed: May 18, 1990
[51] Int. Cl.⁵ .................. B65B 37/00; B65B 37/06; B65B 37/14
[52] U.S. Cl. .................. 141/249; 141/81; 141/258; 141/284; 452/35; 452/42
[58] Field of Search .................. 141/80, 81, 114, 249, 141/258, 260, 270, 284; 452/35, 40, 42

[56] References Cited

U.S. PATENT DOCUMENTS

| | | | |
|---|---|---|---|
| 3,189,939 | 6/1965 | Hughes | 452/35 |
| 4,641,691 | 2/1987 | Corominas | 141/73 |
| 4,672,793 | 6/1987 | Terlizzi | 452/42 |
| 4,723,581 | 2/1988 | Staudenrausch | 452/42 |

Primary Examiner—Henry J. Recla
Assistant Examiner—Scott Flanders
Attorney, Agent, or Firm—Fleit, Jacobson, Cohn, Price, Holman & Stern

[57] ABSTRACT

A meat stuffing machine that operates under vacuum conditions during loading for the purpose of improving the homogeneity of the final product. The machine consists of: a tank supported on a machine frame, which includes a duct connecting it to a vacuum source, a duct for loading meat, and a recess on a side of the tank which houses a pneumatic cylinder used to push the meat product toward the bottom of the tank. An interchangeable gauging cavity contains a pusher means operated by a pneumatic cylinder. The gauging cavity is connected to a plate that is slidably secured to a flat wall of the machine frame, which has an aperture connecting to the tank and a second aperture that leads to a hollow tube that supports a casing. Once the gauging cavity is filled with meat product it slides to the second aperture and fills the casing supported by the hollow tube.

9 Claims, 7 Drawing Sheets

PROCESS AND MACHINE FOR GAUGING AND STUFFING MEAT PRODUCTS UNDER VACUUM CONDITIONS

BACKGROUND OF THE INVENTION

1. Field of the Invention

This invention, especially useful in the pork butchery industry, relates to a process for gauging and stuffing meat products under vacuum conditions. The apparatus, characterized by its simplicity, provides less rubbing or cutting stresses on the meat product than that of conventional processes, and in addition, simpler, less frequent, service maintenance.

2. Description of the Prior Art

Machines for gauging and stuffing meat products are disclosed in Spanish patent no. 468.640 and U.S Pat. No. 4,641,691. Both patents refer to an assembly which includes, as most machines used in the sector, a hopper where the meat product to be stuffed is loaded. Once loaded in the hopper, the meat then passes through a closure-controlled aperture, to a first duct, where a pusher cylinder-plunger assembly transfers a predetermined amount of said meat product into a gauging cavity. In the gauging cavity, a rotating blade is provided whose performance determines the amount of meat product transferred to a second duct. At the second duct, another pusher means leads the meat product directly into bags, containers or molds. U.S. Pat. No. 4,641,691 also discloses the use of vacuum generator means to avoid the formation of air pockets in the product to be stuffed.

Essentially, in the machines according to conventional techniques, the meat product is displaced along a relatively long and arduous circuit with one or several ducts and chambers. Due to bends and elbows in this circuit and the pushing and shearing action of the blades, the meat product is damaged.

In addition to damaging the meat product, the prior art machines demand expensive maintenance to ensure that the long circuit through which the meat is circulated is kept clean and free of meaty incrustations. It is often necessary for the machine to receive a complete cleaning after each stop and long pause of the machine or whenever a new type of meat product is to be stuffed by the same machine.

BRIEF SUMMARY OF THE INVENTION

In order to solve the above problems, this invention was conceived so as to provide a meat stuffing machine that would operate in a way that would reduce the number of meat product displacements along the ducts leading to the stuffing area, and in addition, to operate during the loading stage under vacuum conditions so as to improve the final meat product homogeneity.

To this end, the invention proposes that meat product be transferred from a vacuum tank directly to a tube-shaped gauging cavity. This gauging cavity is interchangeable and has a cross section corresponding to the desired contour of the stuffed product. Once loaded with meat product, the gauging cavity is displaced along a straight line until it is aligned with a corresponding tube having an internal passageway slightly larger than said gauging cavity. A stuffing bag or enclosure is arranged around said tube and held in place by mechanical or manual means. The meat product is directly transferred into the stuffing bag or enclosure from the gauging cavity, which in a previous step was positioned coaxially inside s id tube.

In light of this, instead of circulating the meat product along a static circuit, where the meat product sustains, at the least, a damaging apportioning phase, in the machine according to the invention, a gauging cavity moves from a loading area to stuffing area, and the meat product is kept under a vacuum throughout the stuffing process. Therefor, the meat product displacement is limited to the transfer into and out of the interior of said gauging cavity. Moreover, the gauging cavity is preferably constructed with internal walls of low adherence, this further limiting the damage to said meat product. In addition, the cleaning process is also facilitated, since cleaning will be limited basically to only the single, interchangeable gauging cavity.

The use of the machine is characterized by the following steps:

a) meat product is loaded into a tightly closed tank which is connected to a vacuum equipment;

b) transfer, through a controllable exit aperture of said tank, of a pre-set meat product amount into a hollow body, said hollow body constituting an interchangeable, suitably-sized gauging cavity, the entrance of which faces said exit aperture; the transfer of the meat occurs by the joint action of pushing means operating in the interior of the tank and an adjustable run plunger operating in the interior of said gauging cavity;

c) first displacement of the meat product loaded gauging cavity until it reaches a position facing a second aperture. First displacement occurs with the gauging cavity's entrance closed. Said aperture communicates with the stuffing area and leads to a hollow replaceable tube having a passageway larger than the diameter of the gauging cavity but of equivalent length. The neck portion of the gauging cavity is air-tightly introduced into an aperture of a sliding plate. The aperture acts as both a support and a guide to the anterior end of said cavity, and the sliding plate rests superimposed on a flat wall of the machine bearing said two apertures: the one communicating with the tank and the other with the stuffing area.

d) second straight displacement of said gauging cavity in a orthogonal trajectory with respect to said first movement, into the interior of said hollow tube positioned in the stuffing area;

e) transfer of the meat product from the gauging cavity into the interior of a bag or enclosure that has been previously arranged onto said hollow tube by hand or by mechanic retaining means;

f) return of the empty gauging cavity until its entrance is again facing said first aperture of said tank. Said aperture having been kept closed since the end of step b).

Other features of the invention and the advantages thereof will become apparent from the detailed description below.

BRIEF DESCRIPTION OF THE DRAWINGS

The invention will now be described in detail with reference to the accompanying drawings wherein.

DETAILED DESCRIPTION

Figure 1:
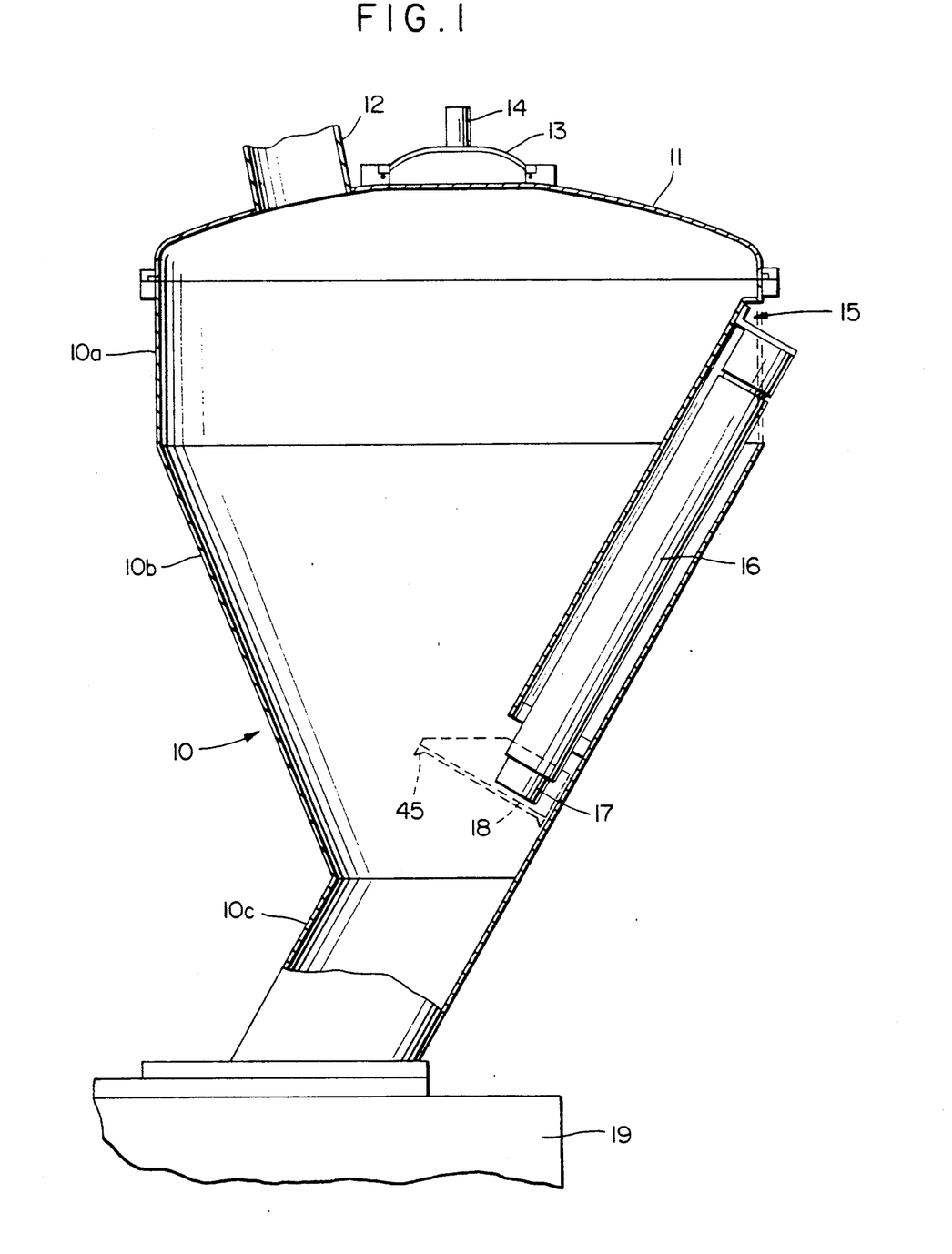
FIG. 1, shows a side cross-section of the tank connected to standard vacuum equipment.

With reference to FIG. 1, a machine intended to carry out the process comprises a large tank 10, with an upper lid 11 tightly closed, that has available a duct 12, for loading the meat product that is sucked into said 10 due to the vacuum condition of the interior of tank 10; a second lid 12, for cleaning has in a central position a duct 14 connecting the tank 10 to a vacuum equipment. The tank 10 includes a first cylindric portion 10a, that is extended in a medium sector 10b, a second inverted frustum shaped 10 portion, of larger axial span, and a third tube-shaped portion 10c, that is oriented in common tilt with one of the side walls of the frustum area 10b of the tank 10, where is defined a recess 15 that lodges an hydraulic plunger 16, whose stem 17 is inserted in the interior of the tank 10 and ends in a plate 18. The plate 18 being treaderlike and with a span slightly smaller than the tube-shaped passageway 10c, of the tank 10. The plate 17 has attached a piece 45 with a cutting profile surrounding the contour of said plate is used to prevent the blocking or overstressing of the plunger as a consequence of meat accumulation in sector 10c which may result in trapping said plate 17. Said tank 10 is supported on machine frame 19.

Figure 2:
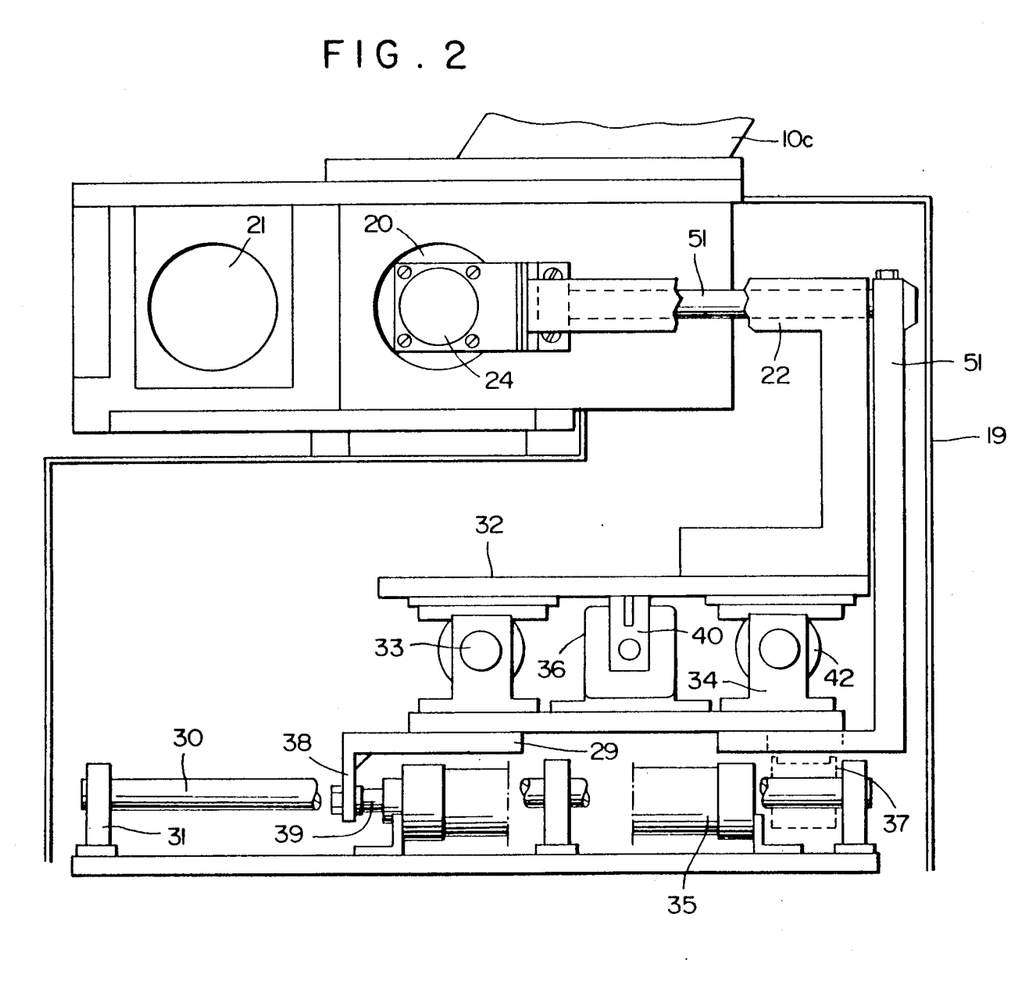
FIG. 2, corresponds to a side elevation view of the machine frame beneath the tank with a section made transparent to reveal the displacement mechanism of the gauging cavity.
Figure 3:
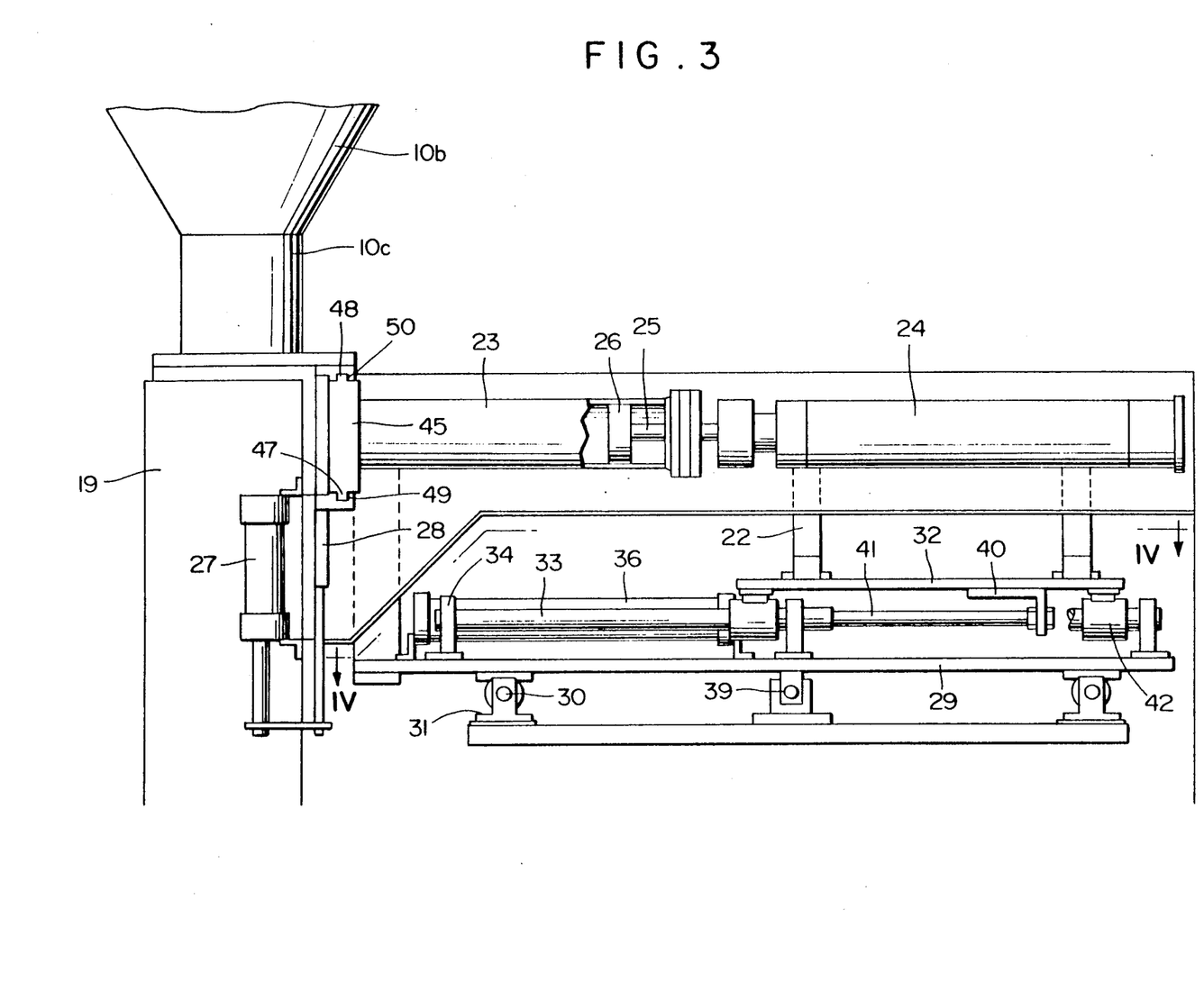
FIG. 3, is another side elevation view, rotated 90 degrees with respect to figure 3, showing the gauging cavity, the means applied to its support and displacement and the means operating the gate that closes said tank exit aperture.
Figure 4:
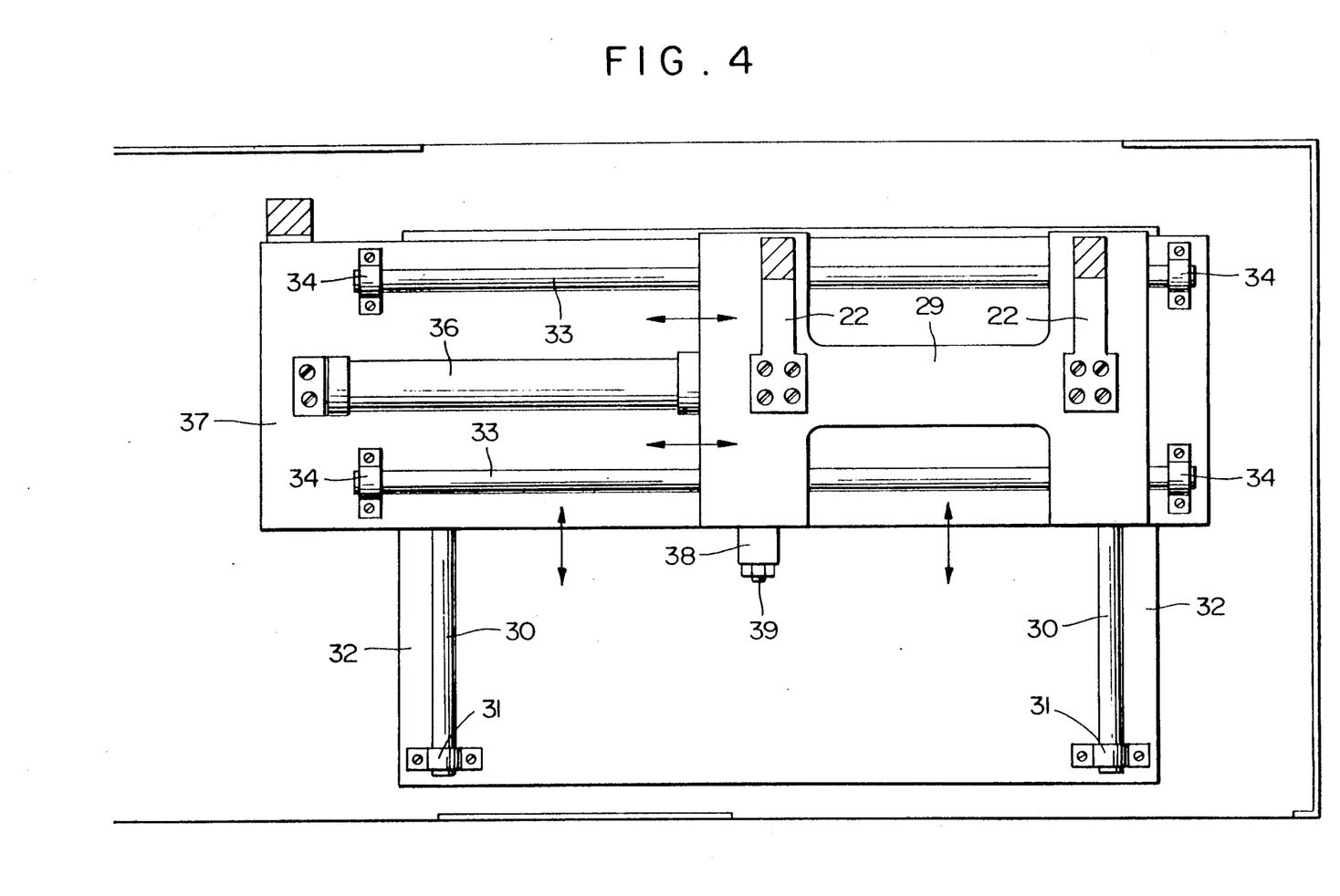
FIG. 4, is a top view of the two platform means used to displace the gauging cavity.

FIG. 2 shows the meat product exit aperture 20 from the tank 10 and aperture 21 that communicates with the stuffing area. FIGS. 2, 3 and 4 show the two supports 22 of the C shaped section, that sustain the sleeve of an adjustable-run pneumatic cylinder 24 the stem 25 of which is introduced into the interior of the hollow tube-shaped body 23, where a plunger at the end of the said stem 25 operates (see FIG. 5 to 12) to admit meat into the hollow tube that constitutes the gauging cavity. The amount of meat product admitted is a function of the degree of displacement of said plunger 26, within said tube-shaped body 23.

In said figures, there also appears a pneumatic cylinder 27 that drives a gate 28 for selective closure of the exit aperture 20. The pneumatic cylinder 27 is attached to machine frame 19.

The tube's end 23 is tightly fitted into a hole of an equivalent diameter provided on a plate 46, the plate being made of a low friction material and mounted in a sliding arrangement superimposed on a flat wall of frame 19, said frame 19 bears apertures 20 and 21, to which end frame 19 possesses protrusions 47 and 48 that are guided in grooves 49 and 50, defined on said flat wall near the tank 10.

Plate 46, in addition to supporting and guiding the anterior end of the tubular cavity 23, has the complementary function of waterproofing the tank 10 once the gate 28 is closed.

The displacement of the assembly formed by the gauging cavity 23 and pneumatic cylinder 24 is driven by a first platform 29 to which plate 46 is attached by a rigid arm 51, said platform 29 being mounted on first guiding columns 30 which are sustained on supports 31 fixed onto the machine bench.

Superimposed on said platform 29 is installed a second platform 32, also moving along second guiding columns 33, in a direction perpendicular to the first platform and sustained on supports 34.

Both platforms 29 and 32 are driven by respective pneumatic cylinders 35 and 36, the first pneumatic cylinder being fixed to the machine bench and the second, as well as its supports 34, being fixed atop platform 29. In this regard, platform 29 has an appendage 38, in the central part if one of its edges and that is connected with the stem 39 of the pneumatic cylinder 35. An embodiment exists wherein the second platform 32 has an appendage 40 connected to stem 41 of pneumatic cylinder 36.

Said platforms 29 and 32 also have sockets, 37 and 42, suitable for coaxially sliding columns 30 and 33, said sockets having available holes for the introduction of lubricating substances helpful in maintaining proper displacement.

According to these figures and the scheme drawn in FIGS. 5 to 12, the machine operates by displacing the gauging cavity 23, between a first position, with its entrance facing the tank exit aperture 20, and a second position, where said hollow body 23 remains with its entrance facing aperture 21, that communicates with the stuffing area. From this position, the gauging cavity 23 together with cylinder 24 is displaced in a perpendicular direction, sliding through said plate 46 and aperture 21 until the gauging cavity 23 is positioned within a hollow tube 43 (see FIGS. 5 to 12), where the enclosure 44 or bag constituting the stuffed product wall (FIG. 9) had been previously coaxially arranged.

Figure 5:
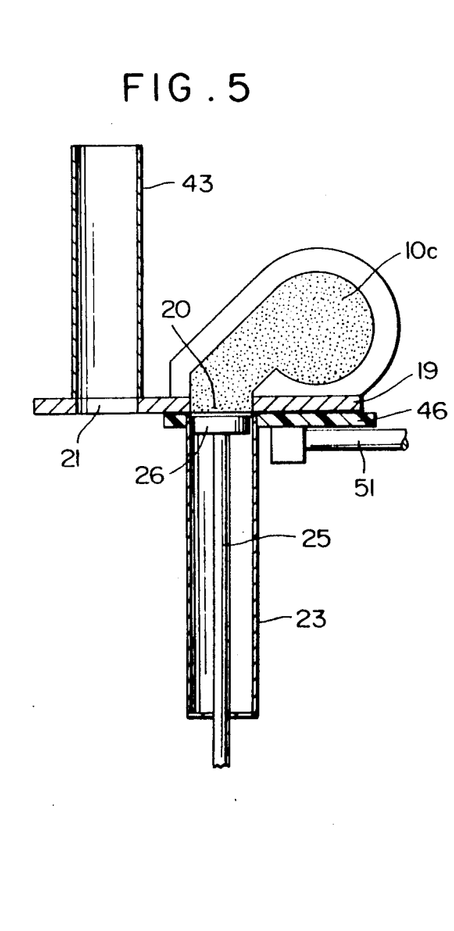
FIGS. 5 to 12 schematically show the different steps of the meat stuffing process.
Figure 6:
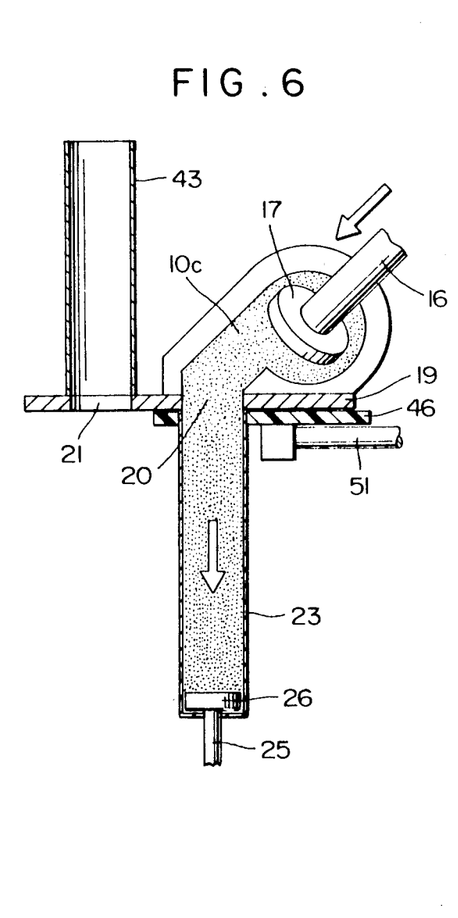
Figure 7:
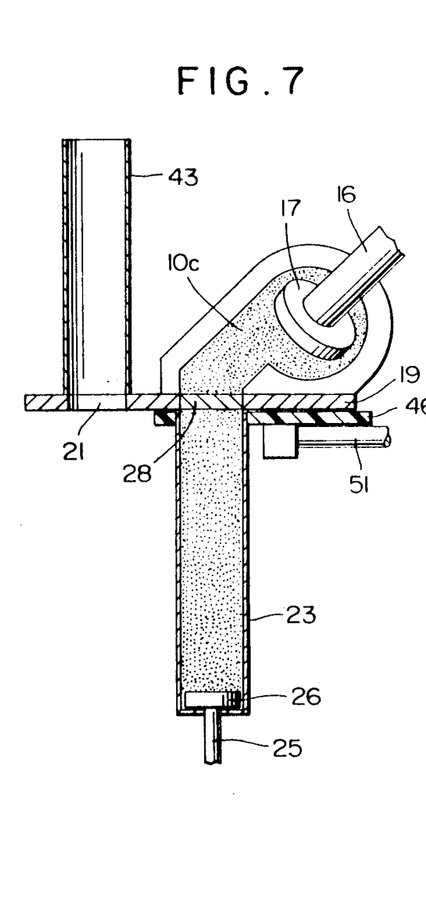

The process is shown in detail in FIGS. 4 to 12. These figures correspond to following steps:

FIG. 5: The situation prior to the filling of the gauging cavity 23 wherein the entrance of said cavity 23 faces the exit aperture 20 and wherein the plunger 26, positioned immediately at the cavity's entrance, is also facing said open aperture 20;

FIG. 6: Filling or the gauging cavity 23, with the assistance of the plunger 26. In this regard, the plunger goes back as pusher 17 advances toward the tube-shaped area 10c of the tank 10;

FIG. 7: End of the gauging cavity 23 filling sequence and closing of the aperture 20 by means of the gate 28 of the tank 10.

Figure 8:
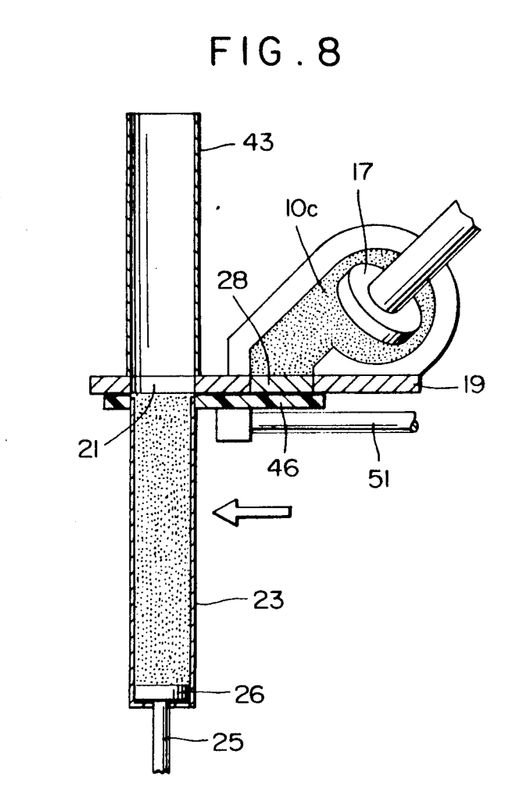
Figure 9:
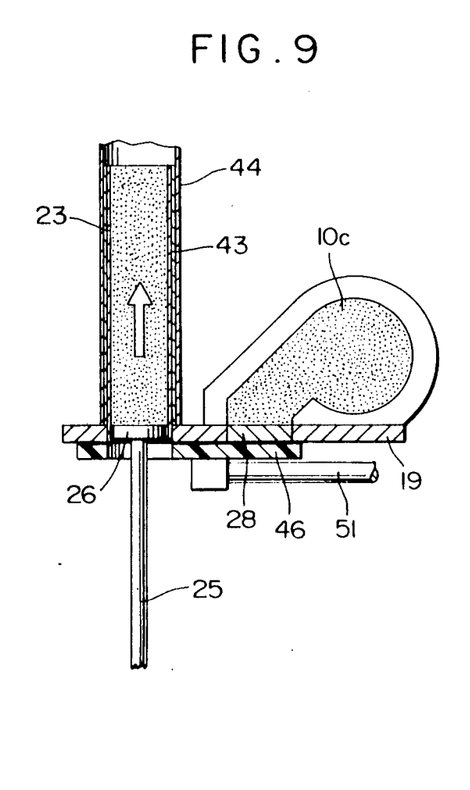
Figure 10:
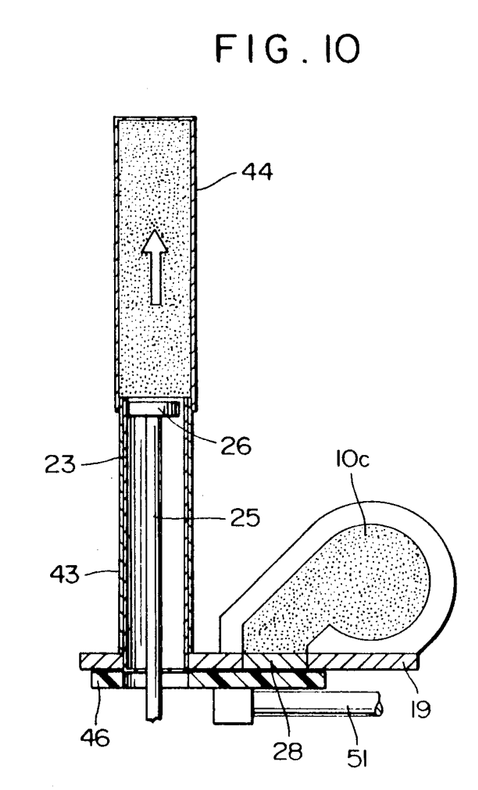
Figure 11:
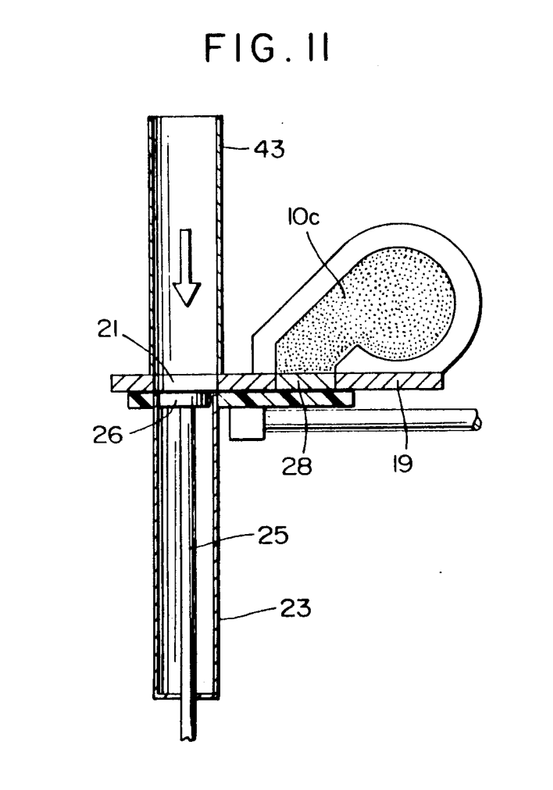
Figure 11A:
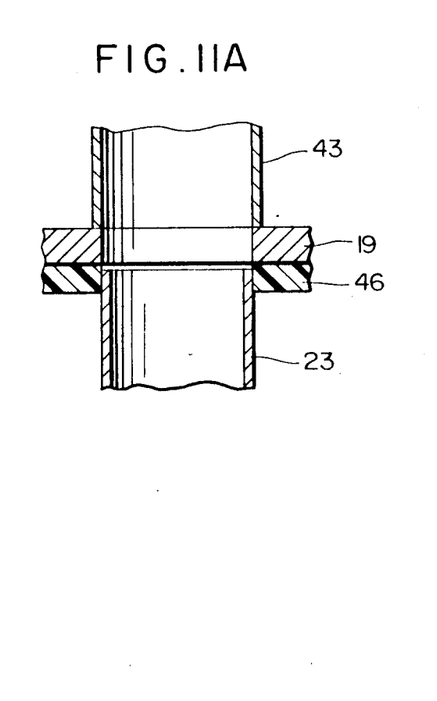
FIG. 11A is an enlarged cross-section of FIG. 11.
Figure 12:
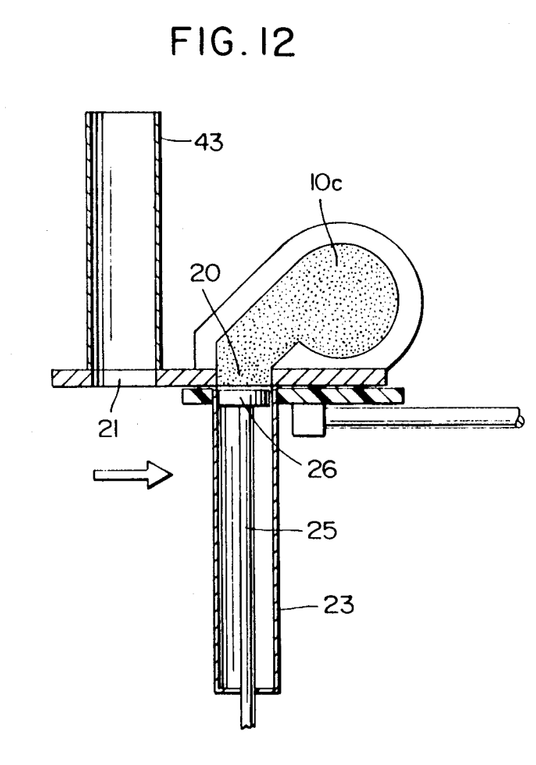

FIG. 8: Displacement of the platform 29 and, with it, the gauging cavity 23 and cylinder 24 assembly. Displacement continues until the gauging cavity entrance faces aperture 21. Aperture 21 leads into hollow tube 43. The gauging cavity is sustained at its anterior end by the plate 46 which is attached to platform 29 by a rigid arm 51. Gauging cavity is supported at its rear by arms 22 attached to the second platform 32;

FIG. 9: Displacement of the second platform 32 and insertion o gauging cavity 23 into hollow tube 43 that has attached to it an enclosure 44 previously arranged; the cavity 23 slides through the hole of plate 46 as plunger 26 remains inoperative;

FIG. 10: Transfer of meat product from the interior of the gauging cavity 23 to a bag or enclosure cover 44 by operation of the plunger 26 of the pneumatic cylinder 24;

FIGS. 11 and 12 show the return of the gauging cavity to the starting position by displacement of the two platforms 29 and 32 in reverse sequence; FIG. 11 also shows detail of the position of the anterior end of cavity 23 air-tightly introduced into a hole of the plate 46.

I claim:

1. A machine for gauging and stuffing meat products under vacuum conditions, comprising:
   a) a tank with a closure connected thereto with tight sealing means, said closure connected to vacuum generating means, said closure provided with a duct for loading said tank with meat product, and said tank provided with a controllable closing exit aperture for discharging meat product from the tank,
   b) a gate movably mounted over said exit aperture and provided with driving means for selective closing and opening of said exit aperture,
   c) a gauging cavity comprising a hollow tube-shaped body having first and second ends coaxially aligned and integral with a pusher means capable of sliding movement in said hollow tube-shaped body, said pusher means having a stem that is axially insertable into the interior of said hollow tube-shaped body, said pusher means also having a plunger slidably mounted in said hollow tube-shaped body for first loading said hollow tube-shaped body with a predetermined amount of meat product transferred from said tank when said plunger moves from said first to second end and subsequently emptying the loaded hollow tube-shaped body when said plunger moves from said second end to said first end,
   d) said tank having a flat wall, said flat wall having said exit aperture and said stuffing area aperture extending therethrough, a plate having a hole through which said first end of said hollow tube-shaped body is tightly introduced, said plate being made of a low friction material and being slidably supported on an assembly, said assembly being superimposed on said flat wall of the tank, with said hole being alignable with said tank exits aperture and said stuffing area aperture,
   e) a hollow tube having a shape commensurate to the shape of said hollow tube-shaped body but having a slightly larger diameter so as to allow coaxial insertion of said hollow tube-shaped body into said hollow tube, one end of said hollow tube being attached to the flat wall on a side opposite said plate and in alignment with said stuffing area aperture, said hollow tube adapted to slidably receive an elongate casing,
   f) first displacing means for linearly displacing said hollow tube-shaped body, pusher means and plate between said first and second positions,
   g) second displacing means for first moving said pusher means from said first to said second end of said hollow tube-shaped body for loading said hollow tube-shaped body and then for moving said hollow tube-shaped body and said pusher means into the hollow tube through the stuffing area aperture and then moving said pusher means from the second end to the first end of the hollow tube-shaped body for emptying the meat product into a casing slidable over said hollow tube.

2. The machine, as claimed in claim 1 wherein:
   the first displacing means includes a first platform to which is attached to said plate by a rigid member, said platform being movably mounted on guiding columns, said guiding columns being sustained on supports fixed on a machine bench.

3. The machine, as claimed in claim 2 wherein:
   a second platform is installed atop the first platform, said second platform being movable along second guiding columns in a direction perpendicular to the first platform, said second guiding columns being sustained on supports attached to said first platform.

4. The machine, as claimed in claim 3, wherein:
   both platforms are displaced by respective stemmed driving means, the driving means of the first platform being fixed to the machine bench, the driving means of the second platform being mounted on said first platform, and each platform having an appendage connected to said stem of its corresponding driving means.

5. The machine, as claimed in claim 3, wherein the second platform is installed on the first platform.

6. The machine, as claimed in claim 1, wherein:
   the tank includes three differentiated portions, comprising an upper cylindric portion, a larger inverted frustum middle portion, and a lower tube-shaped portion, obliquely oriented commensurate with the angle of one of the middle portion side walls and that has an exit aperture on one side near the bottom, said tank including at its upper part a tightly closing lid whose center has an aperture with a smaller closable lid, said smaller closable lid having centrally positioned therein a tube connected to said vacuum generating means, said tank also having available a duct for loading meat product.

7. The machine, as claimed in claim 6, wherein:
   said frustum portion of the tank has in an area of its exterior wall aligned with said lower tube shaped portion a recess housing a stemmed hydraulic cylinder, the stem of said hydraulic cylinder being inserted in the recess and having a foot at its lower end of a slightly smaller dimension than the lower tube-shaped portion, said foot having a cutting means surrounding the foot's periphery.

8. The machine, as claimed in claim 1, wherein:
   the hollow tube-shaped body, the plunger and the hollow tube are replaceable.

9. The machine, as claimed in claim 1, wherein:
   the gauging cavity and its associated pushing means is supported by a support having an approximately C shape, the lower branch of the C shape support being attached to the second platform and the other branch secured to said pushing means.

* * * * *